(12) United States Patent
Gui et al.

(10) Patent No.: US 12,470,302 B2
(45) Date of Patent: Nov. 11, 2025

(54) COHERENT OPTICAL RECEIVER, AND OPTICAL COMMUNICATION DEVICE AND SYSTEM

(71) Applicant: HUAWEI TECHNOLOGIES CO., LTD., Shenzhen (CN)

(72) Inventors: Tao Gui, Dongguan (CN); Xuefeng Wang, Wuhan (CN); Juntao Cao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 351 days.

(21) Appl. No.: 18/332,894

(22) Filed: Jun. 12, 2023

(65) Prior Publication Data

US 2023/0344523 A1    Oct. 26, 2023

Related U.S. Application Data

(63) Continuation of application No. PCT/CN2021/139614, filed on Dec. 20, 2021.

(30) Foreign Application Priority Data

Dec. 30, 2020    (CN) .......................... 202011602198.2

(51) Int. Cl.
H04B 10/61    (2013.01)
(52) U.S. Cl.
CPC ....... H04B 10/615 (2013.01); H04B 10/6164 (2013.01)

(58) Field of Classification Search
CPC ............................................... H04B 10/61–65
See application file for complete search history.

(56) References Cited

U.S. PATENT DOCUMENTS

| 7,483,641 B1 * | 1/2009 | Mak | ..................... | H04B 10/676 |
| | | | | 398/202 |
| 9,819,420 B2 | 11/2017 | Wen et al. | | |
| 10,050,713 B2 | 8/2018 | Li et al. | | |
| 2007/0070501 A1 | 3/2007 | Wen et al. | | |
| 2008/0038001 A1 * | 2/2008 | Becker | ................ | H04B 10/615 |
| | | | | 398/204 |

(Continued)

FOREIGN PATENT DOCUMENTS

CN    102696189 A    9/2012
CN    107408991 A    11/2017

(Continued)

*Primary Examiner* — Nathan M Cors
(74) *Attorney, Agent, or Firm* — Maier & Maier, PLLC

(57) ABSTRACT

A coherent optical receiver, and an optical communication device and system, and relates to the field of optical communication. A polarization control component in the coherent optical receiver can deflect, driven by a feedback control circuit, a state of polarization of local oscillator light, and decompose the local oscillator light into two channels of light having equal or similar optical power. Therefore, the state of polarization of the local oscillator light is not deflected randomly and thereby coherent detection is not affected. Moreover, an azimuth of a half-wave plate device in the polarization control component can be deflected continuously, allowing continuous tracking and adjustment for the state of polarization of the local oscillator light.

20 Claims, 5 Drawing Sheets

(56) References Cited

U.S. PATENT DOCUMENTS

2012/0008951 A1\* 1/2012 Mikami ............... H04B 10/613
 359/325
2017/0285373 A1 10/2017 Zhang et al.
2019/0229811 A1\* 7/2019 Gupta .................. H04B 10/614

FOREIGN PATENT DOCUMENTS

CN 108803091 A 11/2018
CN 112054851 A 12/2020

\* cited by examiner

COHERENT OPTICAL RECEIVER, AND OPTICAL COMMUNICATION DEVICE AND SYSTEM

CROSS-REFERENCE TO RELATED APPLICATIONS

This application is a continuation of International Application No. PCT/CN2021/139614, filed on Dec. 20, 2021, which claims priority to Chinese Patent Application No. 202011602198.2, filed on Dec. 30, 2020. The disclosures of the aforementioned applications are hereby incorporated by reference in their entireties.

TECHNICAL FIELD

The embodiments relate to the field of optical communication, a coherent optical receiver, and an optical communication device and system.

BACKGROUND

Homologous coherent transmission is a low-cost optical signal transmission solution. Based on the transmission solution, an optical communication device on a transmitting side can divide laser light generated by a laser into two channels, where one channel of laser light may be used as local oscillator (LO) light, and the other channel of laser light may be used for generating signal light. The signal light and the LO light may be separately transmitted to an optical communication device on a receiving side via two optical fibers, and the optical communication device on the receiving side may further perform coherent detection on the signal light based on the LO light.

However, in a process in which the LO light is transmitted to the optical communication device on the receiving side via the optical fibers, random deflection occurs on a state of polarization (SOP) of the LO light. As a result, the optical communication device on the receiving side cannot normally perform coherent detection on the signal light.

SUMMARY

The embodiments may provide an optical transmitter component, an optical module, and an optical communication device, to resolve a problem that an optical communication device cannot normally perform coherent detection on signal light due to random deflection of a state of polarization of LO light.

According to one aspect, a coherent optical receiver is provided. The coherent optical receiver includes a first polarization beam splitting device, a polarization control component, a frequency mixing component, a photoelectric detection component, and a feedback control circuit. The polarization control component includes a waveguide-type half-wave plate (half-wave plate, HWP) device and a second polarization beam splitting device. The first polarization beam splitting device is configured to decompose received signal light into two channels of signal light. The half-wave plate device is configured to, driven by a first voltage loaded by the feedback control circuit, deflect a state of polarization of received local oscillator light, where an azimuth of the half-wave plate device can rotate continuously under driving of a voltage within a target range of the voltage. The second polarization beam splitting device is configured to decompose the received local oscillator light into two channels of local oscillator light. The frequency mixing component is configured to mix the two channels of signal light output by the first polarization beam splitting device and the two channels of local oscillator light output by the polarization control component. The photoelectric detection component is configured to convert a mixed optical signal output by the frequency mixing component into an electrical signal. The feedback control circuit is configured to adjust, if a difference between optical power of the two channels of local oscillator light output by the polarization control component is detected to be greater than a difference threshold, a voltage loaded to the half-wave plate device to a second voltage, so that the difference between the optical power is less than or equal to the difference threshold. The second voltage is different from the first voltage.

The polarization control component in the coherent optical receiver can deflect, driven by the feedback control circuit, a state of polarization of local oscillator light, and decompose the local oscillator light into two channels of light having equal or similar optical power. Therefore, the state of polarization of the local oscillator light is not deflected randomly and thereby coherent detection is not affected. Moreover, the azimuth of the half-wave plate device in the polarization control component can be deflected continuously, allowing continuous tracking and adjustment for the state of polarization of the local oscillator light.

Optionally, the half-wave plate device may include an optical waveguide, a first electrode located on one side of the optical waveguide, and a second electrode located on the other side of the optical waveguide. An input end of the second polarization beam splitting device is connected to the optical waveguide, and an output end of the second polarization beam splitting device is connected to an input end of the frequency mixing component. The second polarization beam splitting device is configured to decompose local oscillator light transmitted by the optical waveguide into two channels of local oscillator light and transmit the two channels of local oscillator light to the frequency mixing component. The feedback control circuit is separately connected to the first electrode and the second electrode, and the feedback control circuit is configured to load a voltage to the first electrode and load a voltage to the second electrode.

In the solution, the optical waveguide and the two electrodes may be equivalent to a first-stage HWP. A structure of the first-stage HWP is relatively simple and costs are relatively low.

Optionally, the optical waveguide may be a lithium niobate waveguide. A technology of using a lithium niobate material as an optical waveguide is relatively mature, avoiding increasing costs of the half-wave plate device.

Optionally, the half-wave plate device may include: a plurality of waveguide-type phase modulators, where the plurality of waveguide-type phase modulators may be cascaded between an output end of the second polarization beam splitting device and an input end of the frequency mixing component. The plurality of waveguide-type phase modulators may be configured to deflect the two channels of local oscillator light decomposed by the second polarization beam splitting device and transmit two channels of deflected local oscillator light to the frequency mixing component. The feedback control circuit is separately connected to each of the waveguide-type phase modulators, and the feedback control circuit is configured to separately load a voltage to each of the waveguide-type phase modulators.

Each waveguide-type phase modulator can adjust phases of the local oscillator light in a limited range, and phases of input local oscillator light can be continuously (endlessly) adjusted by cascading the plurality of waveguide-type phase modulators.

Optionally, the plurality of waveguide-type phase modulators may include a first phase modulator, a second phase modulator, a third phase modulator, and a fourth phase modulator that are successively cascaded in a direction away from the second polarization beam splitting device; and the feedback control circuit is configured to load a voltage to each of the waveguide-type phase modulators, so that modulation angles of the four waveguide-type phase modulators to phases of input light satisfy: $\varphi_1=\varphi_3/2$, and $\varphi_2=\varphi_4 \cdot \varphi_1$ is a modulation angle of a phase of input light for the first phase modulator, $\varphi_2$ is a modulation angle of a phase of input light for the second phase modulator, $\varphi_3$ is a modulation angle of a phase of input light for the third phase modulator, and $\varphi_4$ is a modulation angle of a phase of input light for the fourth phase modulator.

In the solution, only four cascaded phase modulators may be configured to continuously adjust the phases of the local oscillator light, ensuring that a structure of the half-wave plate device is relatively simple as possible.

Optionally, the half-wave plate device may further include a first coupler, a second coupler, a third coupler, and a fourth coupler. An input end of the first phase modulator is connected to a first output end of the second polarization beam splitting device. A first input end of the first coupler is connected to a second output end of the second polarization beam splitting device, and a second input end of the first coupler is connected to an output end of the first phase modulator. A first output end of the first coupler is connected to an input end of the second phase modulator, and a second output end of the first coupler is connected to a first input end of the second coupler. A second input end of the second coupler is connected to an output end of the second phase modulator, a first output end of the second coupler is connected to an input end of the third phase modulator, and a second output end of the second coupler is connected to a first input end of the third coupler. A second input end of the third coupler is connected to an output end of the third phase modulator, a first output end of the third coupler is connected to an input end of the fourth phase modulator, and a second output end of the third coupler is connected to a first input end of the fourth coupler. A second input end of the fourth coupler is connected to an output end of the fourth phase modulator, and both a first output end and a second output end of the fourth coupler are connected to an input end of the frequency mixing component.

The plurality of waveguide-type phase modulators may be cascaded via a plurality of couplers, ensuring that the plurality of cascaded waveguide-type phase modulators can adjust phases of the two channels of local oscillator light output by the second polarization beam splitting device.

Optionally, the feedback control circuit includes a first photodetector (photodetector, PD), a second photodetector, and a control subcircuit. The first photodetector is configured to detect first optical power of one channel of polarized light output by the polarization control component. The second photodetector is configured to detect second optical power of another channel of polarized light output by the polarization control component. The control subcircuit is configured to adjust, if a difference between the first optical power and the second optical power is detected to be greater than a difference threshold, a voltage loaded to the half-wave plate device to a second voltage, so that the difference between the first optical power and the second optical power is less than or equal to the difference threshold.

Each photodetector may be connected to an output end of the polarization control component via a splitter, and the splitter may split a part of local oscillator light output by the polarization control component for optical power detection.

Optionally, the control subcircuit may include a first analog-to-digital converter, a second analog-to-digital converter, a signal processor, a digital-to-analog converter, and a driver. The first analog-to-digital converter is configured to convert the first optical power into a first digital signal and transmit the first digital signal to the signal processor. The second analog-to-digital converter is configured to convert the second optical power into a second digital signal and transmit the second digital signal to the signal processor. The signal processor is configured to determine, based on the first digital signal and the second digital signal, a voltage value loaded to the half-wave plate device. The digital-to-analog converter is configured to convert the voltage value into an analog signal and transmit the analog signal to the driver. The driver is configured to load, based on the analog signal, a voltage to the half-wave plate device.

The driver may amplify the analog signal and then load the analog signal to the half-wave plate device, to ensure effective driving on the half-wave plate device.

Optionally, the frequency mixing component may include a first mixer (hybrid) and a second mixer. The first mixer is configured to mix one channel of polarized light output by the polarization control component and one channel of signal light output by the first polarization beam splitting device. The second mixer is configured to mix another channel of polarized light output by the polarization control component and another channel of signal light output by the first polarization beam splitting device. Both the first mixer and the second mixer may be 90° optical mixers.

Because the first polarization beam splitting device may decompose the signal light into two channels of signal light, two mixers may be configured to mix the two channels of signal light separately.

Optionally, both the first polarization beam splitting device and the second polarization beam splitting device are waveguide-type polarization beam splitting rotators. Therefore, the first polarization beam splitting device may decompose the signal light into two channels of signal light having a same state of polarization, and the second polarization beam splitting device may decompose the local oscillator light into two channels of local oscillator light having a same state of polarization.

Optionally, the photoelectric detection component may include a plurality of balanced photodetectors. Each balanced photodetector may include two photodetectors and one differentiator.

According to another aspect, an optical communication device is provided. The optical communication device includes the coherent optical receiver provided in the foregoing aspect, and a signal processing circuit. The signal processing circuit is configured to process an electrical signal output by the coherent optical receiver.

Optionally, the optical communication device further includes a laser, an optical splitter, and a modulator. The optical splitter is configured to decompose laser light emitted by the laser into local oscillator light and modulated light, send the local oscillator light through a first port, and transmit the modulated light to the modulator. The modulator is configured to modulate, based on a received data signal, the modulated light to obtain signal light, and send the signal light through a second port.

According to still another aspect, an optical communication system is provided. The optical communication system includes: a first optical communication device and a second optical communication device. At least one of the first optical communication device and the second optical communication device may be the optical communication device provided in the foregoing aspect.

Optionally, both the first optical communication device and the second optical communication device are the optical communication devices provided in the foregoing aspect. The optical communication system further includes a first optical fiber and a second optical fiber connected between the first optical communication device and the second optical communication device. The first optical fiber is configured to transmit local oscillator light, and the second optical fiber is configured to transmit signal light.

The solutions have at least the following advantageous effects:

The embodiment may provide the coherent optical receiver, the optical communication device and system. The polarization control component in the coherent optical receiver can deflect, driven by the feedback control circuit, the state of polarization of local oscillator light, and decompose the local oscillator light into two channels of light having equal or similar optical power. In this way, the state of polarization of the local oscillator light is not deflected randomly and thereby coherent detection is not affected. Moreover, the azimuth of the half-wave plate device in the polarization control component can be deflected continuously, implementing continuous tracking and adjustment for the state of polarization of the local oscillator light.

DETAILED DESCRIPTION OF THE EMBODIMENTS

The following describes a coherent optical receiver, and an optical communication device and system provided in the embodiments in detail with reference to the accompanying drawings.

In a homologous coherent transmission solution, after receiving signal light and local oscillator light, an optical communication device at a receiving end needs to decompose the signal light into two channels of signal light whose states of polarization are orthogonal and decompose the local oscillator light into two channels of local oscillator light whose states of polarization are orthogonal, to perform coherent detection on two channels of signal light separately. However, if depolarization occurs in the local oscillator light transmitted through an optical fiber, the local oscillator light in one state of polarization may not be completely received, and further coherent detection cannot be performed on the two channels of signal light decomposed.

Figure 1:
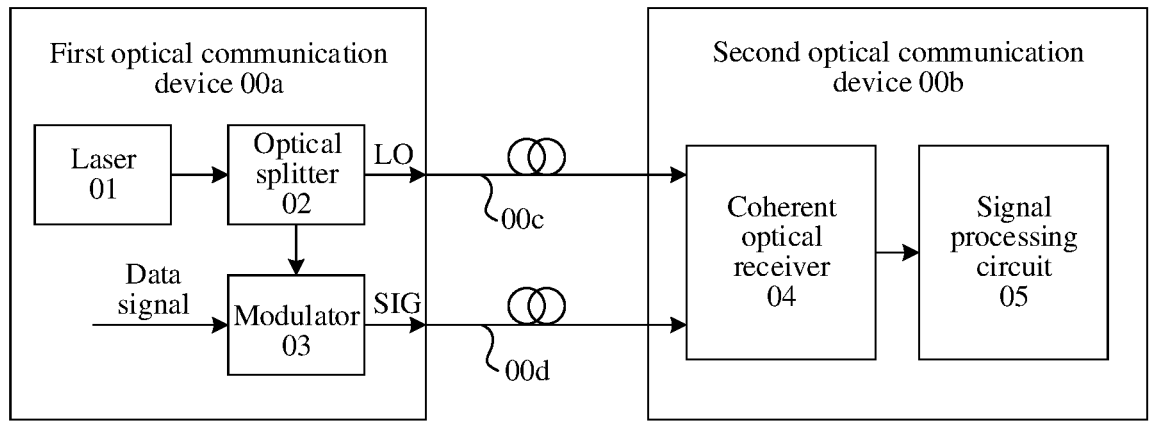
FIG. 1 is a schematic structural diagram of an optical communication system according to an embodiment.

FIG. 1 is a schematic structural diagram of an optical communication system according to an embodiment. The system may include a first optical communication device 00a, a second optical communication device 00b, and a first optical fiber 00c and a second optical fiber 00d that are connected between the first optical communication device 00a and the second optical communication device 00b. One of the two optical communication devices may serve as a transmitting end to send an optical signal, and the other may serve as a receiving end to receive the optical signal. The following uses an example in which the first optical communication device 00a is an optical communication device on a transmitting side and the second optical communication device 00b is an optical communication device on a receiving side as an example for description.

As shown in FIG. 1, the first optical communication device 00a may include a laser 01, an optical splitter 02, and a modulator 03. The laser 01 is configured to emit laser light. The optical splitter 02 is configured to divide the laser light emitted by the laser 01 into two channels. One channel of the laser light may be used as local oscillator light to be transmitted to the second optical communication device 00b through the first optical fiber 00c, and another channel of the laser light may be transmitted to the modulator 03. The modulator 03 is configured to modulate, based on an obtained data signal, laser light transmitted by the optical splitter 02 to obtain signal (signal, SIG) light. The signal light may be transmitted to the second optical communication device 00b through the second optical fiber 00d.

The second optical communication device 00b may include a coherent optical receiver 04 and a signal processing circuit 05. After receiving local oscillator light and signal light that are sent by the first optical communication device 00a, the coherent optical receiver 04 may perform coherent detection on the signal light based on the local oscillator light and may transmit an electrical signal obtained through coherent detection to the signal processing circuit 05. The signal processing circuit 05 may further process the electrical signal to obtain a data signal.

In the optical communication system shown in FIG. 1, both the signal light and the local oscillator light are generated by the first optical communication device 00a on the transmitting side. Therefore, the optical communication system may also be referred to as a homologous coherent optical transmission system. Compared with the local oscillator light directly generated by a laser in the optical communication device on the receiving side, because the homologous coherent optical transmission system does not need to ensure accurate frequency synchronization between the lasers in the optical communication device on the transmitting side and the optical communication device on the receiving side, a distributed feedback laser (DFB) having a thick line and no temperature control may be used, thereby greatly reducing a cost of a light source. In addition, the homologous coherent optical transmission system may further reduce complexity of a carrier phase estimation (CPE) algorithm and a local oscillator frequency offset (LOFO) recovery algorithm for optical digital signal processing (ODSP) to improve efficiency of signal processing.

It may be understood that, in this embodiment, the first optical communication device 00a may further include the coherent optical receiver 04 and the signal processing circuit 05, and the second optical communication device 00b may further include the laser 01, the optical splitter 02, and the modulator 03. That is, the first optical communication device 00a may also serve as an optical communication device on the receiving side and receive the local oscillator light and the signal light sent by the second optical communication device 00b. Correspondingly, the optical communication system may also be referred to as a homologous coherent bidirectional transmission system.

To resolve a problem of random deflection of a state of polarization of local oscillator light in the homologous coherent optical transmission system, an additional polarization tracking locking module is added to an input end of a coherent optical receiver in the related technology. The polarization tracking locking module is generally formed by a phase modulator, and the phase modulator can adjust a phase of local oscillator light under voltage driving, to convert local oscillator light in any state of polarization into a linear polarization state and output the local oscillator light in the linear polarization state to the coherent optical receiver. Therefore, it can be ensured that the coherent optical receiver implements homologous coherent detection.

However, a modulation angle of the phase modulator to the phase of the local oscillator light is bounded, that is, the phase modulator can adjust the phase of the local oscillator light only in a limited angle range (for example, 0 to 2π). Because the phase modulator cannot implement continuous adjustment to the phase of the local oscillator light, when the modulation angle of the phase modulator to the phase of the local oscillator light reaches an upper limit, if the phase of the local oscillator light needs to be continuously adjusted, the phase modulator needs to be reset (reset). However, in a process of resetting the phase modulator, continuous tracking and adjustment for the state of polarization of the local oscillator light cannot be implemented, that is, in a solution in the related technology, real-time tracking and adjustment for the state of polarization of the local oscillator light cannot be implemented, thereby affecting normal receiving of signal light.

An embodiment may provide a coherent optical receiver. The coherent optical receiver may be used in an optical communication device, and the optical communication device may be used in a homologous coherent optical transmission system. For example, the coherent optical receiver may be used in the second optical communication device 00b in the system shown in FIG. 1. The coherent optical receiver includes a first polarization beam splitting device 10, a polarization control component 20, a frequency mixing component 30, a photoelectric detection component 40, and a feedback control circuit 50.

The polarization control component 20 includes a waveguide-type half-wave plate device 21 and a second polarization beam splitting device 22.

The first polarization beam splitting device 10 is configured to decompose received signal light into two channels of signal light. Power of the two channels of signal light may be equal, and states of polarization of the two channels of signal light may be the same or different. For example, the states of polarization of the two channels of signal light may be an X polarization state and a Y polarization state respectively, or the states of polarization of the two channels of signal light may both be the X polarization state.

The waveguide-type half-wave plate device 21 is configured to, driven by a first voltage loaded by the feedback control circuit 50, deflect a state of polarization of received local oscillator light. In addition, an azimuth of the waveguide-type half-wave plate device 21 can rotate continuously under driving of a voltage within a target range of the voltage. That is, the azimuth of the half-wave plate device 21 can rotate in an endless manner under driving of a voltage within a limited range, allowing continuous tracking and adjustment for the state of polarization of the local oscillator light.

The second polarization beam splitting device 22 is configured to decompose the received local oscillator light into two channels of local oscillator light. For example, the second polarization beam splitting device 22 may perform polarization diversity on the received local oscillator light to obtain two channels of local oscillator light, and states of polarization of the two channels of local oscillator light may be the same.

The frequency mixing component 30 is configured to mix the two channels of signal light output by the first polarization beam splitting device and the two channels of local oscillator light output by the polarization control component.

The photoelectric detection component 40 is configured to convert a mixed optical signal output by the frequency mixing component 30 into an electrical signal.

The feedback control circuit 50 is configured to adjust, if a difference between optical power of the two channels of local oscillator light output by the polarization control component 20 is detected to be greater than a difference threshold, a voltage loaded to the half-wave plate device 21 to a second voltage, so that the difference between the optical power is less than or equal to the difference threshold. The second voltage is different from the first voltage, and both the first voltage and the second voltage fall within the target voltage range.

The difference threshold may be a fixed value preconfigured in the feedback control circuit 50, and the difference threshold may be relatively small. That is, when detecting that the difference between the optical power of the two channels of local oscillator light output by the polarization control component 20 is relatively large, the feedback control circuit 50 may adjust a voltage loaded to the half-wave plate device 21 to make optical power of the two channels of local oscillator light output by the polarization control component 20 equal or approximately equal.

It may be understood that, in this embodiment, an output end of the half-wave plate device 21 may be connected to an input end of the second polarization beam splitting device 22. Correspondingly, the half-wave plate device 21 may first deflect a state of polarization of input local oscillator light, and then transmit deflected local oscillator light to the second polarization beam splitting device 22. The second polarization beam splitting device 22 may further decompose the deflected local oscillator light into two channels of local oscillator light.

Alternatively, an output end of the second polarization beam splitting device 22 may be connected to an input end of the half-wave plate device 21. Correspondingly, the second polarization beam splitting device 22 may first decompose an input local oscillator light into two channels of local oscillator light, and then transmit the two channels of local oscillator light to the half-wave plate device 21. The half-wave plate device 21 may further deflect states of polarization of the two channels of local oscillator light.

In conclusion, this embodiment may provide the coherent optical receiver. The polarization control component in the coherent optical receiver can deflect, driven by the feedback control circuit, a state of polarization of local oscillator light, and decompose the local oscillator light into two channels of light having equal or similar optical power. In this way, the state of polarization of the local oscillator light is not deflected randomly and thereby coherent detection is not affected.

In addition, the azimuth of the half-wave plate device in the polarization control component can be continuously deflected, allowing continuous tracking and adjustment for the state of polarization of the local oscillator light, thereby avoiding impact on normal receiving of signal light.

Optionally, in this embodiment, both the first polarization beam splitting device 10 and the second polarization beam splitting device 22 may be a polarization splitter rotator (PSR), and the PSR may be a waveguide device. The PSR may decompose incident light into two channels of light (power of the two channels of light is equal) in the X polarization state and the Y polarization state and may deflect light in the Y polarization state into light in the X polarization state. That is, the PSR may decompose the incident light into two channels of light having a same state of polarization. Alternatively, the first polarization beam splitting device 10 may be a polarization beam splitter (polarization beam splitter, PBS).

Figure 3:
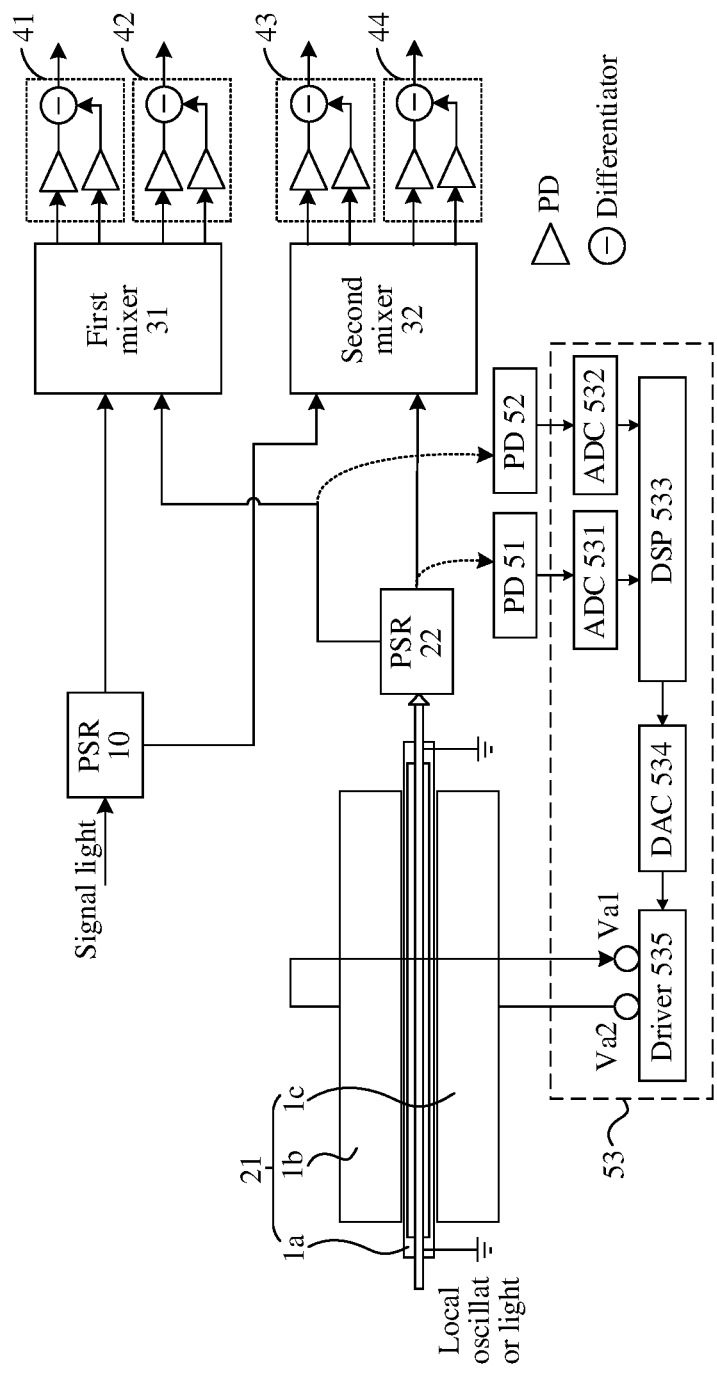
FIG. 3 is a schematic structural diagram of another coherent optical receiver according to an embodiment.

In an optional implementation, an output end of the half-wave plate device 21 may be connected to an input end of the second polarization beam splitting device 22. As shown in FIG. 3, the half-wave plate device 21 may include an optical waveguide 1a, a first electrode 1b on one side of the optical waveguide 1a, and a second electrode 1c on another side of the optical waveguide 1a. The optical waveguide 1a may be a lithium niobate (LiNbO3) waveguide, and a technology of using a lithium niobate material as an optical waveguide is mature, so that an increase in costs of the half-wave plate device 21 can be avoided. Additionally, the optical waveguide 1a may also be a waveguide made of another material.

An input end of the second polarization beam splitting device 22 is connected to the optical waveguide 1a, an output end of the second polarization beam splitting device 22 is connected to an input end of the frequency mixing component 30, and the second polarization beam splitting device 22 is configured to decompose local oscillator light transmitted by the optical waveguide 1a into two channels of local oscillator light, and transmit the two channels of local oscillator light to the frequency mixing component 30. States of polarization of the two channels of local oscillator light decomposed by the second polarization beam splitting device 22 may be the same.

The feedback control circuit 50 is separately connected to the first electrode 1b and the second electrode 1c, and the feedback control circuit 50 is configured to load a voltage Va1 to the first electrode 1b and load a voltage Va2 to the second electrode 1c. The voltage Va1 and the voltage Va2 may be orthogonal to each other, that is, the half-wave plate device 21 may work under driving of an orthogonal electric field. In addition, the feedback control circuit 50 may adjust the voltage loaded to each electrode.

It may be understood that, as the voltage Va1 loaded to the first electrode 1b and the voltage Va2 loaded to the second electrode 1c change, a refractive index of the optical waveguide 1a also changes accordingly. Further, a deflection degree of a state of polarization of local oscillator light incident to the optical waveguide 1a can be changed. That is, adjusting the voltage loaded to the first electrode 1b and the second electrode 1c may be equivalent to adjusting an azimuth of the half-wave plate device 21.

In addition, in this implementation, the optical waveguide 1a and the two electrodes may be equivalent to a first-stage HWP. A structure of the first-stage HWP is relatively simple, and costs are relatively low.

Suppose that the azimuth of the waveguide-type half-wave plate device 21 is γ, a rotation matrix (which may also be referred to as a Jones matrix) H(γ) of the waveguide-type half-wave plate device 21 to a state of polarization of incident local oscillator light may be expressed as:

$$H(\gamma) = -j \begin{pmatrix} \cos\gamma & \sin\gamma \\ \sin\gamma & -\cos\gamma \end{pmatrix}.$$

j is an imaginary unit.

Figure 4:
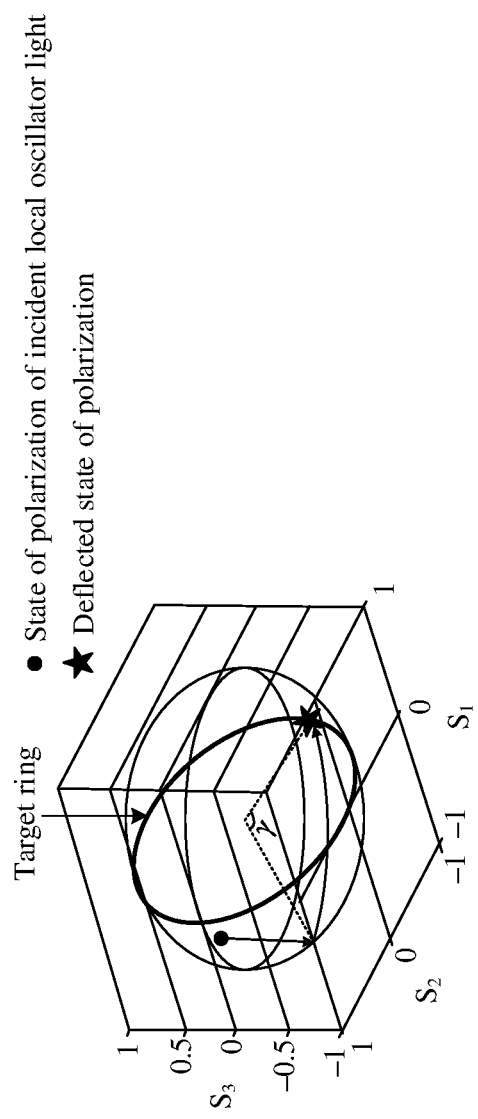
FIG. 4 is a schematic diagram of a Poincare sphere according to an embodiment.

FIG. 4 is a schematic diagram of a Poincare sphere according to an embodiment. A space in which the Poincare sphere is located may be defined by three mutually perpendicular spatial axes $S_1$, $S_2$, and $S_3$. In addition, a spherical center of the Poincare sphere is located at origin of a three-dimensional coordinate axis, and a radius is $S_0$. $S_0$, $S_1$, $S_2$, and $S_3$ are Stokes parameters. Any point on a spherical surface of the Poincare sphere can represent a state of polarization of a light wave. For example, each point on an equator (that is, a circle formed by points of $S_3=0$) in the Poincare sphere may represent linearly polarized light having different vibration directions. Each point on an upper hemisphere may represent left-handed elliptically polarized light. Each point on a lower hemisphere may represent the right-handed elliptically polarized light.

A process in which the half-wave plate device 21 deflects a state of polarization of incident local oscillator light may be understood from a perspective of the Poincare sphere as follows: A state of polarization of any point on the spherical surface is symmetrical to another hemisphere by using the equator as an axis, and then the state of polarization rotates by a fixed angle γ in a latitude direction, so that the state of polarization is located on a target ring (which may also be referred to as a warp) of $S_1=0$ in the Poincare sphere. The angle γ is the azimuth of the half-wave plate device 21.

When the state of polarization of the local oscillator light is located on the target ring of $S_1=0$ in the Poincare sphere, power of the two channels of local oscillator light decomposed by the second polarization beam splitting device 22 may be equal. Therefore, in this embodiment, the azimuth of the waveguide-type half-wave plate device 21 may be adjusted, so that after the local oscillator light in any state of polarization is deflected by the half-wave plate device 21, a point used to represent a deflected state of polarization may be located on the ring of $S_1=0$.

In addition, in this embodiment, the azimuth of the half-wave plate device 21 can rotate in an endless manner under driving of a voltage within a target range. Therefore, simple and high-speed tracking and adjustment for the state of polarization of the local oscillator light can be implemented.

Figure 5:
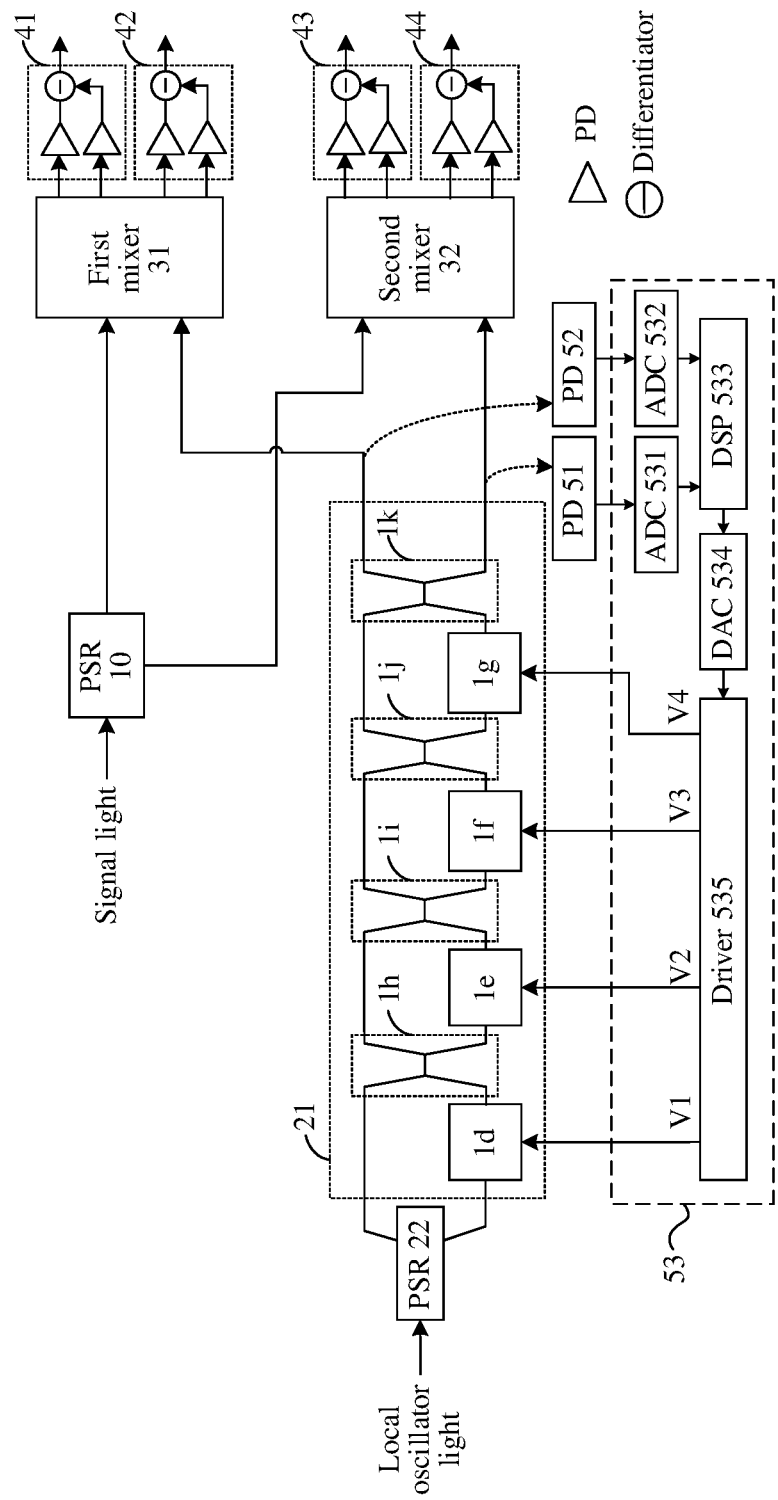
FIG. 5 is a schematic structural diagram of still another coherent optical receiver according to an embodiment.

In another optional implementation, an output end of the second polarization beam splitting device 22 may be connected to an input end of the half-wave plate device 21. As shown in FIG. 5, the half-wave plate device 21 may include a plurality of cascaded waveguide-type phase modulators. For example, FIG. 5 shows four waveguide-type phase modulators 1d to 1g in total. Each waveguide-type phase modulator may also be referred to as a phase shifter (PS).

The plurality of waveguide-type phase modulators may be cascaded between an output end of the second polarization beam splitting device 22 and an input end of the frequency mixing component 30. The plurality of waveguide-type phase modulators may be configured to deflect two channels of local oscillator light decomposed by the second polarization beam splitting device 22 and transmit two channels of deflected local oscillator light to the frequency mixing component 30. States of polarization of the two channels of local oscillator light decomposed by the second polarization beam splitting device 22 may be the same.

The feedback control circuit 50 is separately connected to each of the waveguide-type phase modulators, and the feedback control circuit 50 is configured to separately load a voltage to each of the waveguide-type phase modulators. In addition, the feedback control circuit 50 may adjust a voltage loaded to any waveguide-type phase modulator.

Each waveguide-type phase modulator can adjust, when driven by a voltage, phases of input local oscillator light within a limited range (for example, 0 to $2\pi$). However, by cascading the plurality of waveguide-type phase modulators, the phases of the local oscillator light may be continuously adjusted, that is, a state of polarization of the local oscillator light may be continuously deflected. In other words, a plurality of cascaded waveguide-type phase modulators may be equivalent to a half-wave plate whose azimuth can rotate continuously.

Optionally, as shown in FIG. 5, the plurality of waveguide-type phase modulators may include a first phase modulator 1d, a second phase modulator 1e, a third phase modulator 1f, and a fourth phase modulator 1g that are successively cascaded in a direction away from the second polarization beam splitting device 22.

The feedback control circuit 50 is configured to load a voltage to each of the waveguide-type phase modulators, so that modulation angles of the four waveguide-type phase modulators to phases of input light satisfy: $\varphi_1 = \varphi_3/2$, and $\varphi_2 = \varphi_4$.

$\varphi_1$ is a modulation angle of a phase of input light for the first phase modulator 1d, $\varphi_2$ is a modulation angle of a phase of input light for the second phase modulator 1e, $\varphi_3$ is a modulation angle of a phase of input light for the third phase modulator 1f, and $\varphi_4$ is a modulation angle of a phase of input light for the fourth phase modulator 1g.

Suppose that the azimuth of the half-wave plate device 21 equivalent to the four cascaded waveguide-type phase modulators is $\gamma$, it can be ensured that a difference between optical power of the two channels of local oscillator light output to the frequency mixing component 30 is less than or equal to a difference threshold. In this case, modulation angles of the four cascaded waveguide-type phase modulators to the phases of the input local oscillator light may satisfy:

$$\varphi_1 = \varphi_3/2 = \pi/2 - \arctan(\cos(=)); \varphi_2 = \varphi_4 - 2 \arccos((\sin \gamma)/\sqrt{2}).$$

In this implementation, only four cascaded phase modulators may be configured to continuously adjust the phases of the local oscillator light, to ensure that a structure of the half-wave plate device 21 is relatively simple as possible.

Optionally, the half-wave plate device 21 may further include a first coupler 1h, a second coupler 1i, a third coupler 1j, and a fourth coupler 1k.

An input end of the first phase modulator 1d is connected to a first output end of the second polarization beam splitting device 22.

A first input end of the first coupler 1h is connected to a second output end of the second polarization beam splitting device 22, a second input end of the first coupler 1h is connected to an output end of the first phase modulator 1d, a first output end of the first coupler 1h is connected to an input end of the second phase modulator 1e, and a second output end of the first coupler 1h is connected to a first input end of the second coupler 1i.

A second input end of the second coupler 1i is connected to an output end of the second phase modulator 1e, a first output end of the second coupler 1i is connected to an input end of the third phase modulator 1f, and a second output end of the second coupler 1i is connected to a first input end of the third coupler 1j.

A second input end of the third coupler 1j is connected to an output end of the third phase modulator 1f, a first output end of the third coupler 1j is connected to an input end of the fourth phase modulator 1g, and second output end of the third coupler 1j is connected to a first input end of the fourth coupler 1k.

A second input end of the fourth coupler 1k is connected to an output end of the fourth phase modulator 1g, and both a first output end and a second output end of the fourth coupler 1k are connected to an input end of the frequency mixing component 30.

In an embodiment, every two adjacent phase modulators, and the phase modulator and the frequency mixing component 30 may be cascaded by using a coupler. An insertion loss of each coupler may be 3 dB, that is, each coupler may be a 3 dB coupler. The plurality of waveguide-type phase modulators may be cascaded via a plurality of couplers, ensuring that the plurality of cascaded waveguide-type phase modulators can adjust phases of the two channels of local oscillator light output by the second polarization beam splitting device 22.

Optionally, as shown in FIG. 4 and FIG. 5, the feedback control circuit 50 may include a first photodetector 51, a second photodetector 52, and a control subcircuit 53.

The first photodetector 51 is configured to detect first optical power of one channel of polarized light output by the polarization control component 20, and the second photodetector 52 is configured to detect second optical power of another channel of polarized light output by the polarization control component 20.

The control subcircuit 53 is configured to adjust, if a difference between the first optical power and the second optical power is detected to be greater than a difference threshold, a voltage loaded to the half-wave plate device 21 to a second voltage, so that the difference between the first optical power and the second optical power is less than or equal to the difference threshold. For example, so that the difference is equal to 0.

In an embodiment, the control subcircuit 53 may adjust, by using a gradient descent algorithm, a voltage loaded to the half-wave plate device 21 to a second voltage, so that the difference between the first optical power and the second optical power is less than or equal to a difference threshold.

For example, the control subcircuit 53 may first adjust, along a first direction, a voltage loaded to the half-wave plate device 21 and detect whether a difference between the first optical power and the second optical power detected after voltage adjustment becomes smaller. If the difference between the two optical powers after the voltage adjustment becomes smaller, the control subcircuit 53 may continue to adjust, along the first direction, the voltage loaded to the half-wave plate device 21, until the difference between the two optical powers is less than or equal to the difference threshold. If the difference between the two optical powers after the voltage adjustment becomes larger, the control subcircuit 53 may adjust, along a second direction, the voltage loaded to the half-wave plate device 21, until the difference between the two optical powers is less than or equal to the difference threshold.

The first direction may be a direction in which the voltage increases or decreases, and the second direction is a direction opposite to the first direction. For example, if the first direction is a direction in which the voltage increases, the second direction may be a direction in which the voltage decreases.

For the half-wave plate device 21 shown in FIG. 3, the control subcircuit 53 may adjust the voltage Va1 loaded to the first electrode 1b and adjust the voltage Va2 loaded to the second electrode 1c. For the half-wave plate device 21 shown in FIG. 5, the control subcircuit 53 may separately adjust a voltage loaded to each phase modulator, for example, may separately adjust a voltage V1 loaded to the first phase modulator 1d, a voltage V2 loaded to the second phase modulator 1e, a voltage V3 loaded to the third phase modulator 1f, and a voltage V4 loaded to the fourth phase modulator 1g.

It may be understood that, in this embodiment of, the first photodetector 51 may be connected to an output end of the polarization control component 20 by using a first splitter (which may also be referred to as an optical splitter). The second photodetector 52 may be connected to another output end of the polarization control component 20 by using a second splitter. Each splitter of the first splitter and the second splitter may split one channel of local oscillator light transmitted at an output end connected to the splitter, to transmit one part of the local oscillator light to the frequency mixing component 30 and another part of the local oscillator light to a photodetector. For example, each splitter may split 5% of the local oscillator light transmitted at the output end to a photodetector to which the splitter is connected.

The splitter splits a small part of local oscillator light for optical power detection, so that impact on coherent detection to signal light can be avoided based on ensuring reliable adjustment of the voltage loaded to the half-wave plate device 21.

The control subcircuit 53 may include a first analog-to-digital converter (ADC) 531, a second analog-to-digital converter 532, a signal processor 533, a digital-to-analog converter (DAC) 534, and a driver 535. The signal processor 533 may be a digital signal processor (DSP).

The first analog-to-digital converter 531 is connected to the first photodetector 51 and is configured to convert the first optical power into a first digital signal and transmit the first digital signal to the signal processor 533.

The second analog-to-digital converter 532 is connected to the second photodetector 52 and is configured to convert the second optical power into a second digital signal and transmit the second digital signal to the signal processor 533.

The signal processor 533 is connected to the digital-to-analog converter 534, and is configured to determine, based on the first digital signal and the second digital signal, a voltage value loaded to the half-wave plate device 21, and transmit the voltage value to the digital-to-analog converter 534. For example, the signal processor 533 may detect, based on the first digital signal and the second digital signal, whether a difference between the first optical power and the second optical power is greater than a difference threshold. If it is determined that the difference is greater than the difference threshold, the voltage value loaded to the half-wave plate device 21 may be adjusted. If it is determined that the difference is not greater than the difference threshold, the voltage value may remain unchanged.

The digital-to-analog converter 534 is connected to the driver 535 and is configured to convert the voltage value into an analog signal and transmit the analog signal to the driver 535.

The driver 535 is connected to the half-wave plate device 21 and is configured to load a voltage to the half-wave plate device 21 based on the analog signal. For example, the driver 535 may amplify the analog signal and then load the analog signal to the half-wave plate device 21, to ensure effective driving on the half-wave plate device 21.

Optionally, as shown in FIG. 3 and FIG. 5, the frequency mixing component 30 may include a first mixer 31 and a second mixer 32.

The first mixer 31 is configured to mix one channel of polarized light output by the polarization control component 20 and one channel of signal light output by the first polarization beam splitting device 10.

The second mixer 32 is configured to mix another channel of polarized light output by the polarization control component 20 and another channel of signal light output by the first polarization beam splitting device 10.

Both the first mixer 31 and the second mixer 32 may be 90° optical mixers. In this embodiment, because the first polarization beam splitting device 10 may decompose the signal light into two channels of signal light, the two mixers may be configured to mix the two channels of signal light separately.

Optionally, the photoelectric detection component 40 may include a plurality of balanced photodetectors (BPDs). For example, the photoelectric detection component 40 may include four balanced photodetectors. The first mixer 31 is connected to the balanced photodetector 41 and the balanced photodetector 42 respectively, and the second mixer 32 is connected to the balanced photodetector 43 and the balanced photodetector 44 respectively. Each balanced photodetector may include two PDs and one differentiator. Input ends of the two PDs are connected to the frequency mixing component 30, and output ends are connected to the differentiator. The differentiator may calculate a difference between optical power output by the two PDs and may output the difference to a back-end processing circuit.

In conclusion, this embodiment may provide the coherent optical receiver. The polarization control component in the coherent optical receiver can deflect, driven by the feedback control circuit, a state of polarization of local oscillator light, and decompose the local oscillator light into two channels of light having equal or similar optical power. Therefore, the state of polarization of the local oscillator light is not deflected randomly and thereby coherent detection is not affected.

In addition, the azimuth of the half-wave plate device in the polarization control component can be continuously deflected, allowing continuous tracking and adjustment for the state of polarization of the local oscillator light, thereby avoiding impact on normal receiving of signal light.

Figure 2:
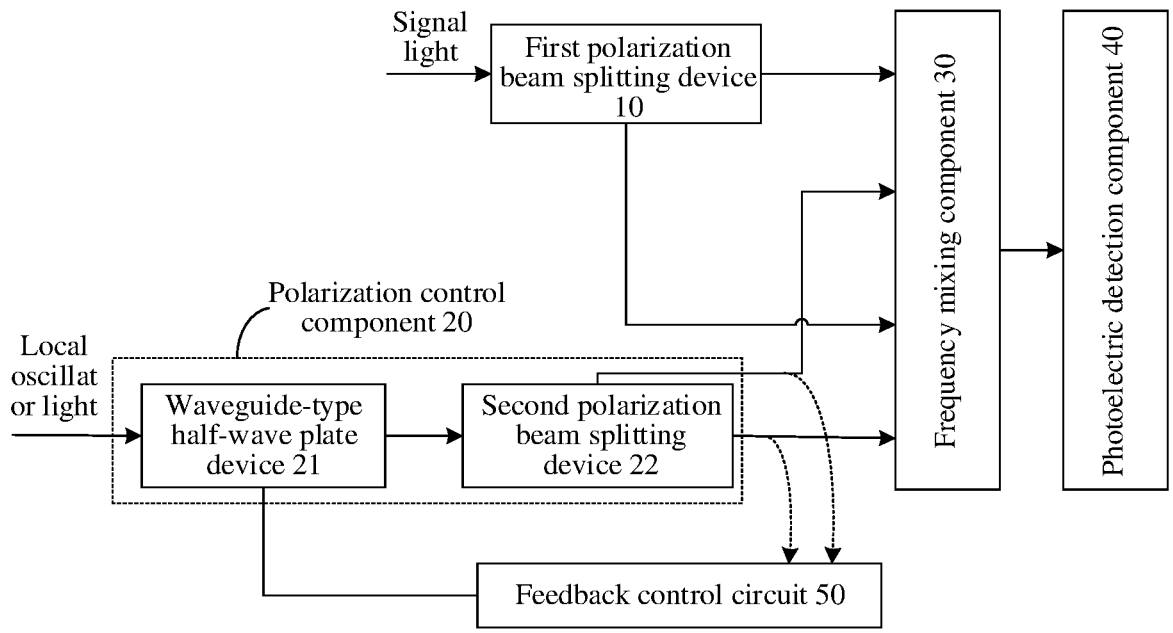
FIG. 2 is a schematic structural diagram of a coherent optical receiver according to an embodiment.
Figure 6:
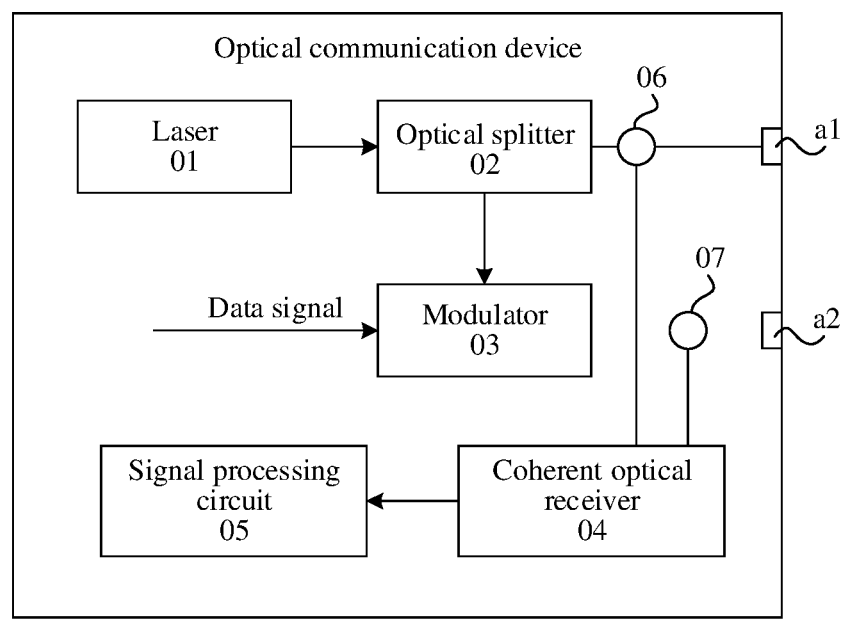
FIG. 6 is a schematic structural diagram of an optical communication device according to an embodiment.

An embodiment may further provide an optical communication device. As shown in FIG. 1 and FIG. 6, the optical communication device may include the coherent optical receiver 04 and the signal processing circuit 05 provided in the foregoing embodiments. The coherent optical receiver 04 may be the coherent optical receiver shown in FIG. 2, FIG. 4, or FIG. 5.

The signal processing circuit 05 is configured to process an electrical signal output by the coherent optical receiver 04, to recover a data signal from the electrical signal. Optionally, the signal processing circuit 05 may be a DSP.

The optical communication device may further include a laser 01, an optical splitter 02, and a modulator 03.

The optical splitter 02 is configured to decompose laser light emitted by the laser 01 into local oscillator light and modulated light, send the local oscillator light through a first port a1, and transmit the modulated light to the modulator 03.

The modulator 03 is configured to modulate, based on a received data signal, the modulated light to obtain signal light, and send the signal light through a second port a2.

In other words, in this embodiment, the optical communication device may be served as a receiving end to receive signal light and may further be served as a transmitting end to transmit signal light, thereby effectively improving flexibility of using the optical communication device.

Optionally, in this embodiment, the coherent optical receiver 04 may also be separately connected to the first port a1 and the second port a2. The coherent optical receiver 04 may receive local oscillator light through the first port a1 and may receive signal light through the second port a2. Correspondingly, as shown in FIG. 6, the optical communication device may further include a first light discrete device 06 and a second light discrete device 07. The first light discrete device 06 is separately connected to the first port a1, the optical splitter 02, and the coherent optical receiver 04, and the second light discrete device 07 is separately connected to the second port a2, the modulator 03, and the coherent optical receiver 04.

The first light discrete device 06 is configured to transmit local oscillator light output by the optical splitter 02 to the first port a1 and prevent the local oscillator light from entering the coherent optical receiver 04. The first light discrete device 06 is further configured to transmit local oscillator light received through the first port a1 to the coherent optical receiver 04 and prevent the local oscillator light from entering the optical splitter 02.

The second light discrete device 07 is configured to transmit signal light output by the modulator 03 to the second port a2 and prevent the signal light from entering the coherent optical receiver 04. The second light discrete device 07 is further configured to transmit signal light received through the second port a2 to the coherent optical receiver 04 and prevent the signal light from entering the modulator 03.

Optionally, each of the first light discrete device 06 and the second light discrete device 07 may be a filter, an optical coupler, an optical isolator, or the like.

Based on the foregoing connection manner, an optical communication device having signal light receiving and sending functions only needs to be connected to an optical communication device at a peer end through two optical fibers. In this way, a quantity of optical fibers required in an optical communication system is effectively reduced, thereby simplifying a structure of the optical communication system and reducing costs of the optical communication system.

It may be understood that the optical communication device provided in this embodiment may be used in a data center network (DCN) or a data center interconnection (DCI).

An embodiment may further provide an optical communication system. The optical communication system includes a first optical communication device 00a and a second optical communication device 00b, where at least one of the first optical communication device 00a and the second optical communication device 00b may be the optical communication device provided in the foregoing embodiment. For example, the second optical communication device 00b may be the optical communication device including the coherent optical receiver 04 provided in the foregoing embodiment.

Optionally, both the first optical communication device 00a and the second optical communication device 00b are optical communication devices having signal light receiving and sending functions, for example, may be optical communication devices shown in FIG. 6.

Correspondingly, the optical communication system may further include a first optical fiber 00c and a second optical fiber 00d connected between the first optical communication device 00a and the second optical communication device 00b. The first optical fiber 00c is configured to transmit local oscillator light, and the second optical fiber 00d is configured to transmit signal light.

In addition, in this embodiment, the first optical fiber 00c may bidirectionally transmit the local oscillator light, and the second optical fiber 00d may bidirectionally transmit the signal light. Therefore, a quantity of optical fibers required by the optical communication system can be effectively reduced, thereby reducing costs of the optical communication system.

It may be understood that the optical communication system may further include at least another optical communication device other than the first optical communication device 00a and the second optical communication device 00b. The another optical communication device may be connected to the first optical communication device 00a and/or the second optical communication device 00b.

Terms such as "first" and "second" may be used to distinguish same items or similar items that have same effects and functions. It should be understood that there is no logical or time sequence dependency between "first", "second", and "nth". A quantity and an execution sequence are not limited. For example, the first optical fiber may be referred to as a second optical fiber, and similarly, the second optical fiber may be referred to as a first optical fiber without departing from the scope of the various described examples.

"At least one" means at least one and "a plurality of" means two or more. The terms "system" and "network" are often used interchangeably herein.

It should be understood that "and/or" may indicate that three relationships may exist. For example, A and/or B may represent the following three cases: only A exists, both A and B exist, and only B exists. The character "/" generally indicates an "or" relationship between the associated objects.

The foregoing descriptions are merely optional implementations but are not intended to limit. Any modification or replacement readily figured out by a person skilled in the art shall fall within the scope of the embodiments.

What is claimed is:

1. A coherent optical receiver, comprising:
a first polarization beam splitting device, wherein the first polarization beam splitting device is configured to decompose received signal light into two channels of signal light;
a polarization control component, wherein the polarization control component comprises a half-wave plate device and a second polarization beam splitting device;
a frequency mixing component configured to mix the two channels of signal light output by the first polarization beam splitting device and the two channels of local oscillator light output by the polarization control component;
a photoelectric detection component configured to convert a mixed optical signal output by the frequency mixing component into an electrical signal; and
a feedback control circuit, wherein
the half-wave plate device is configured to, driven by a first voltage loaded by the feedback control circuit, deflect a state of polarization of received local oscillator light, wherein an azimuth of the half-wave plate device can rotate continuously under driving of a voltage within a target range of the voltage;

the second polarization beam splitting device is configured to decompose the received local oscillator light into two channels of local oscillator light, and the feedback control circuit is configured to adjust, after a difference between optical power of the two channels of local oscillator light output by the polarization control component is detected to be greater than a difference threshold, a voltage loaded to the half-wave plate device to a second voltage, so that the difference between the optical power is less than or equal to the difference threshold.

2. The coherent optical receiver according to claim 1, wherein the half-wave plate device further comprises:
an optical waveguide,
a first electrode located on one side of the optical waveguide, and
a second electrode located on the other side of the optical waveguide, wherein
an input end of the second polarization beam splitting device is connected to the optical waveguide, an output end of the second polarization beam splitting device is connected to an input end of the frequency mixing component, and the second polarization beam splitting device is configured to decompose local oscillator light transmitted by the optical waveguide into two channels of local oscillator light, and transmit the two channels of local oscillator light to the frequency mixing component; and
the feedback control circuit is separately connected to the first electrode and the second electrode, and the feedback control circuit is configured to separately load a voltage to the first electrode and the second electrode.

3. The coherent optical receiver according to claim 2, wherein the optical waveguide is a lithium niobate waveguide.

4. The coherent optical receiver according to claim 1, wherein polarization control component further comprises:
a plurality of waveguide-type phase modulators cascaded between an output end of the second polarization beam splitting device and an input end of the frequency mixing component, the plurality of waveguide-type phase modulators are configured to deflect the two channels of local oscillator light decomposed by the second polarization beam splitting device, and transmit two channels of deflected local oscillator light to the frequency mixing component; and
the feedback control circuit is separately connected to each of the waveguide-type phase modulators, and the feedback control circuit is configured to separately load a voltage to each of the waveguide-type phase modulators.

5. The coherent optical receiver according to claim 4, wherein the plurality of waveguide-type phase modulators further comprises:
a first phase modulator,
a second phase modulator,
a third phase modulator, and
a fourth phase modulator that are successively cascaded in a direction away from the second polarization beam splitting device; and
the feedback control circuit is configured to load a voltage to each of the waveguide-type phase modulators, so that modulation angles of the four waveguide-type phase modulators to phases of input light satisfy: $\varphi_1 = \varphi_3/2$, and $\varphi_2 = \varphi_4$, wherein
$\varphi_1$ is a modulation angle of a phase of input light for the first phase modulator, $\varphi_2$ is a modulation angle of a phase of input light for the second phase modulator, $\varphi_3$ is a modulation angle of a phase of input light for the third phase modulator, and $\varphi_4$ is a modulation angle of a phase of input light for the fourth phase modulator.

6. The coherent optical receiver according to claim 5, wherein polarization control component further comprises:
a first coupler,
a second coupler,
a third coupler, and
a fourth coupler;
an input end of the first phase modulator is connected to a first output end of the second polarization beam splitting device;
a first input end of the first coupler is connected to a second output end of the second polarization beam splitting device, a second input end of the first coupler is connected to an output end of the first phase modulator, a first output end of the first coupler is connected to an input end of the second phase modulator, and a second output end of the first coupler is connected to a first input end of the second coupler;
a second input end of the second coupler is connected to an output end of the second phase modulator, a first output end of the second coupler is connected to an input end of the third phase modulator, and a second output end of the second coupler is connected to a first input end of the third coupler;
a second input end of the third coupler is connected to an output end of the third phase modulator, a first output end of the third coupler is connected to an input end of the fourth phase modulator, and a second output end of the third coupler is connected to a first input end of the fourth coupler; and
a second input end of the fourth coupler is connected to an output end of the fourth phase modulator, and both a first output end and a second output end of the fourth coupler are connected to an input end of the frequency mixing component.

7. The coherent optical receiver according to claim 1, wherein the feedback control circuit further comprises:
a first photodetector,
a second photodetector, and
a control subcircuit;
the first photodetector is configured to detect first optical power of one channel of polarized light output by the polarization control component;
the second photodetector is configured to detect second optical power of another channel of polarized light output by the polarization control component; and
the control subcircuit is configured to adjust, if a difference between the first optical power and the second optical power is detected to be greater than a difference threshold, a voltage loaded to the half-wave plate device to a second voltage, so that the difference between the first optical power and the second optical power is less than or equal to the difference threshold.

8. The coherent optical receiver according to claim 7, wherein the control subcircuit further comprises:
a first analog-to-digital converter, wherein the first analog-to-digital converter is configured to convert the first optical power into a first digital signal and transmit the first digital signal to the signal processor;

a second analog-to-digital converter, wherein the second analog-to-digital converter is configured to convert the second optical power into a second digital signal and transmit the second digital signal to the signal processor;
a signal processor, wherein the signal processor is configured to determine, based on the first digital signal and the second digital signal, a voltage value loaded to the half-wave plate device;
a digital-to-analog converter, wherein the digital-to-analog converter is configured to convert the voltage value into an analog signal, and transmit the analog signal to the driver; and
a driver
is configured to load, based on the analog signal, a voltage to the half-wave plate device.

9. The coherent optical receiver according to claim 1, wherein the frequency mixing component further comprises:
a first mixer configured to mix one channel of polarized light output by the polarization control component and one channel of signal light output by the first polarization beam splitting device; and
a second mixer
configured to mix another channel of polarized light output by the polarization control component and another channel of signal light output by the first polarization beam splitting device.

10. The coherent optical receiver according to claim 1, wherein both the first polarization beam splitting device and the second polarization beam splitting device are waveguide-type polarization beam splitting rotators.

11. The coherent optical receiver according to claim 1, wherein the photoelectric detection component further comprises:
a plurality of balanced photodetectors.

12. An optical communication device, comprising:
a coherent optical receiver, wherein the coherent optical receiver comprises a first polarization beam splitting device configured to decompose received signal light into two channels of signal light, a polarization control component comprising a half-wave plate device and a second polarization beam splitting device, a frequency mixing component, a photoelectric detection component, and a feedback control circuit; and
a signal processing circuit, wherein
the half-wave plate device is configured to, driven by a first voltage loaded by the feedback control circuit, deflect a state of polarization of received local oscillator light, wherein an azimuth of the half-wave plate device can rotate continuously under driving of a voltage within a target range of the voltage;
the second polarization beam splitting device is configured to decompose the received local oscillator light into two channels of local oscillator light;
the frequency mixing component is configured to mix the two channels of signal light output by the first polarization beam splitting device and the two channels of local oscillator light output by the polarization control component;
the photoelectric detection component is configured to convert a mixed optical signal output by the frequency mixing component into an electrical signal;
the feedback control circuit is configured to adjust, if a difference between optical power of the two channels of local oscillator light output by the polarization control component is detected to be greater than a difference threshold, a voltage loaded to the half-wave plate device to a second voltage, so that the difference between the optical power is less than or equal to the difference threshold; and
the signal processing circuit is configured to process the electrical signal output by the coherent optical receiver.

13. The optical communication device according to claim 12, wherein the optical communication device further comprises a laser, an optical splitter, and a modulator;
the optical splitter is configured to decompose laser light emitted by the laser into local oscillator light and modulated light, send the local oscillator light through a first port, and transmit the modulated light to the modulator; and
the modulator is configured to modulate, based on a received data signal, the modulated light to obtain signal light, and send the signal light through a second port.

14. The optical communication device according to claim 12, wherein the half-wave plate device further comprises:
an optical waveguide, a first electrode located on one side of the optical waveguide, and a second electrode located on the other side of the optical waveguide, wherein
an input end of the second polarization beam splitting device is connected to the optical waveguide, an output end of the second polarization beam splitting device is connected to an input end of the frequency mixing component, and the second polarization beam splitting device is configured to decompose local oscillator light transmitted by the optical waveguide into two channels of local oscillator light, and transmit the two channels of local oscillator light to the frequency mixing component; and
the feedback control circuit is separately connected to the first electrode and the second electrode, and the feedback control circuit is configured to separately load a voltage to the first electrode and the second electrode.

15. The optical communication device according to claim 14, wherein the optical waveguide is a lithium niobate waveguide.

16. The optical communication device according to claim 12, wherein polarization control component further comprises:
a plurality of waveguide-type phase modulators, wherein the plurality of waveguide-type phase modulators are cascaded between an output end of the second polarization beam splitting device and an input end of the frequency mixing component, and the plurality of waveguide-type phase modulators are configured to deflect the two channels of local oscillator light decomposed by the second polarization beam splitting device, and transmit two channels of deflected local oscillator light to the frequency mixing component; and
the feedback control circuit is separately connected to each of the waveguide-type phase modulators, and the feedback control circuit is configured to separately load a voltage to each of the waveguide-type phase modulators.

17. The optical communication device according to claim 16, wherein the plurality of waveguide-type phase modulators further comprises:
a first phase modulator,
a second phase modulator,
a third phase modulator, and
a fourth phase modulator that are successively cascaded in a direction away from the second polarization beam splitting device; and the feedback control circuit is configured to load a voltage to each of the waveguide-type phase modulators, so that modulation angles of the four waveguide-type phase modulators to phases of input light satisfy: $\varphi_1=\varphi_3/2$, and $\varphi_2=\varphi_4$, wherein $\varphi_1$ is a modulation angle of a phase of input light for the first phase modulator, $\varphi_2$ is a modulation angle of a phase of input light for the second phase modulator, $\varphi_3$ is a modulation angle of a phase of input light for the third phase modulator, and $\varphi_4$ is a modulation angle of a phase of input light for the fourth phase modulator.

18. The optical communication device according to claim 17, wherein polarization control component further comprises:

a first coupler,
a second coupler,
a third coupler, and
a fourth coupler;
an input end of the first phase modulator is connected to a first output end of the second polarization beam splitting device;
a first input end of the first coupler is connected to a second output end of the second polarization beam splitting device, a second input end of the first coupler is connected to an output end of the first phase modulator, a first output end of the first coupler is connected to an input end of the second phase modulator, and a second output end of the first coupler is connected to a first input end of the second coupler;
a second input end of the second coupler is connected to an output end of the second phase modulator, a first output end of the second coupler is connected to an input end of the third phase modulator, and a second output end of the second coupler is connected to a first input end of the third coupler;
a second input end of the third coupler is connected to an output end of the third phase modulator, a first output end of the third coupler is connected to an input end of the fourth phase modulator, and a second output end of the third coupler is connected to a first input end of the fourth coupler; and
a second input end of the fourth coupler is connected to an output end of the fourth phase modulator, and both a first output end and a second output end of the fourth coupler are connected to an input end of the frequency mixing component.

19. The optical communication device according to claim 12, wherein the feedback control circuit further comprises:

a first photodetector configured to detect first optical power of one channel of polarized light output by the polarization control component;
a second photodetector configured to detect second optical power of another channel of polarized light output by the polarization control component; and
a control subcircuit
configured to adjust, after a difference between the first optical power and the second optical power is detected to be greater than a difference threshold, a voltage loaded to the half-wave plate device to a second voltage, so that the difference between the first optical power and the second optical power is less than or equal to the difference threshold.

20. An optical communication system, comprising:
a first optical communication device; and
a second optical communication device, wherein at least one of the first optical communication device and the second optical communication device is the optical communication device according to claim 12.

* * * * *